UNITED STATES PATENT OFFICE.

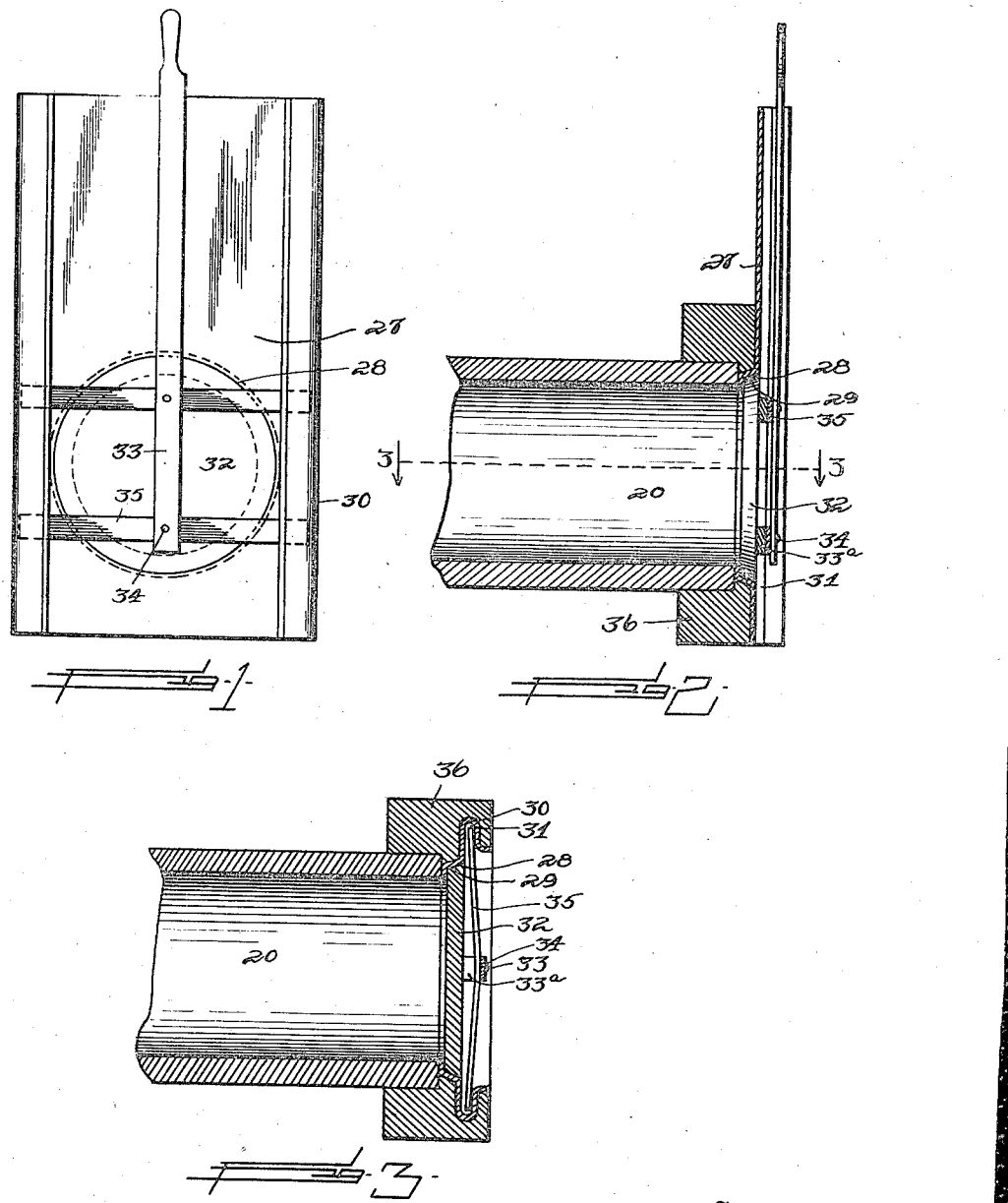

WILSON P. HARLAN, OF BRAWLEY, CALIFORNIA.

FLUME-GATE.

1,063,438.

Specification of Letters Patent. Patented June 3, 1913.

Application filed July 18, 1912. Serial No. 710,178.

*To all whom it may concern:*

Be it known that I, WILSON P. HARLAN, a citizen of the United States, residing at Brawley, in the county of Imperial and State of California, have invented certain new and useful Improvements in Flume-Gates, of which the following is a specification.

My invention relates to new and useful improvements in flume gate structures.

An important object of this invention is to provide a novel head upon a flume or pipe which head is adapted to receive a valve or gate that may be moved to different positions for opening or closing the flume.

A further object of the invention is to provide novel means to yieldingly hold the valve or gate in its closed position.

Other objects and advantages of the invention will be apparent during the course of the following description.

In the accompanying drawings forming a part of this specification and in which like numerals are employed to designate like parts throughout the same, Figure 1 is a front face view of a sheet-metal plate which is held within the head, Fig. 2 is a vertical sectional view taken on line 6—6 of Fig. 1, and Fig. 3 is a horizontal section taken on line 3—3 of Fig. 2.

The numeral 27 designates an upstanding sheet-metal plate, provided with an opening 28 which is in registration with the opening of the flume 20. The opening 28 has its wall 29 bent inwardly or beveled, as shown. The plate 27 is provided upon its longitudinal edges with flanges 30, forming sockets 31.

The numeral 32 designates a valve or gate which is rigidly connected with an upstanding rod or arm 33 by means of bolts 34 or the like and has its periphery beveled, as shown. The bolts 34 pass through spacing blocks 33ª, as shown. These bolts 34 also pass through leaf-springs 35, the ends of which operate within the sockets 31. The leaf-springs 35 serve to yieldingly hold the valve or gate 32 within the opening 28 and permit of its removal therefrom when the lever 33 is forced upwardly.

The numeral 36 designates a head formed of concrete or the like which is molded about one end of the flume 20 and also surrounds the plate 27.

It is to be understood that the form of my invention herewith shown and described is to be taken as a preferred example of the same and that certain changes in the shapes, sizes, and arrangements of parts may be resorted to without departing from the spirit of the invention or the scope of the subjoined claims.

Having thus described my invention, I claim:—

1. In a flume gate structure of the character described, a flume, a plate disposed near the end thereof and provided with an opening leading into the opening of the flume and having its wall beveled, a valve to be moved into and out of the opening and having its periphery beveled, a leaf spring connected with the valve, and guide means receiving the ends of the leaf spring.

2. In a flume gate structure of the character described, a flume, a sheet-metal plate disposed near the end of the flume and provided with an opening which leads into the flume and having flanges formed upon corresponding edges thereof to provide sockets, a valve to normally close the opening in the sheet-metal plate, leaf-springs connected with the valve and movably mounted in the sockets, means to move the valve, and means to connect the sheet-metal plate with the flume.

3. In a flume gate structure, a flume, a sheet metal plate disposed adjacent one end thereof and having an opening formed therethrough which leads into the flume, said sheet metal plate having its material adjacent its longitudinal edges bent back upon itself to form longitudinal sockets, a valve to cover and uncover the opening of the sheet metal plate, means connected with the valve and slidably mounted in the sockets, and a plastic head molded about the end of the flume and the sheet metal plate to form a secure and water tight connection therebetween.

In testimony whereof I affix my signature in presence of two witnesses.

WILSON P. HARLAN.

Witnesses:
A. L. SEBILLE,
J. E. BLAKENEY.